United States Patent [19]

Sloan

[11] Patent Number: 5,021,156
[45] Date of Patent: Jun. 4, 1991

[54] DUMP TRUCK FOR RECEIVING DRAINING AND DISPOSING OF DREDGED MATERIAL

[75] Inventor: Albert H. Sloan, Ft. Lauderdale, Fla.

[73] Assignee: Subaqueous Services, Inc., Ft. Lauderdale, Fla.

[21] Appl. No.: 581,875

[22] Filed: Sep. 13, 1990

Related U.S. Application Data

[63] Continuation of Ser. No. 346,951, May 3, 1989, Pat. No. 4,975,205.

[51] Int. Cl.⁵ .............................................. B60P 1/28
[52] U.S. Cl. ........................................ 210/241; 37/59; 210/248; 210/519; 296/56; 296/184; 298/22 R; 298/23 D; 298/27; 414/679
[58] Field of Search ................. 37/58, 59; 210/241, 210/248, 320, 519, 513; 296/25, 56, 101, 184; 298/23 R, 23 D, 25, 27, 22 R, 22 P; 414/679

[56] References Cited

U.S. PATENT DOCUMENTS

| | | | |
|---|---|---|---|
| 1,627,336 | 5/1927 | Nelson | 296/184 |
| 3,819,069 | 6/1974 | Bauman et al. | 414/679 |
| 4,155,586 | 5/1979 | Flynn | 296/56 |
| 4,323,279 | 4/1982 | Domes et al. | 296/56 |
| 4,377,475 | 3/1983 | Wiedemann | 210/241 |
| 4,751,395 | 6/1988 | Centofanti | 296/56 |
| 4,816,167 | 3/1989 | Vanderslice | 210/241 |

Primary Examiner—Robert A. Dawson
Assistant Examiner—Joseph Drodge
Attorney, Agent, or Firm—Nilles & Nilles

[57] ABSTRACT

The truck has an hydraulic pump for receiving dredged mixture of solids and water from a pumping site and delivering the mixture to the truck body. A fixed partition wall is mounted transversely in the body and divides the body into first and second open compartments. The first compartment receives the mixture from the pump means to enable solids to settle at the bottom of the first compartment and the water rises towards the top of the compartment. The second compartment receives the water which rises in the first compartment and the partition wall. Drain means are selectively operable to effect removal of substantially all water from the second compartment. A one-way valve is located between the first and second compartments and is operable when the body is tilted to permit residual water in the second compartment to flow into the first compartment to effect removal of remaining solid matter from the first compartment by washing it out of the tilted body via the open tailgate.

6 Claims, 4 Drawing Sheets

DUMP TRUCK FOR RECEIVING DRAINING AND DISPOSING OF DREDGED MATERIAL

Cross-Reference to Related Application

This is a continuation application of U.S. Ser. No. 07/346,951, filed May 3, 1989 and now U.S. Pat. No. 4,975,205.

BACKGROUND OF THE INVENTION

1. Field of Use

This invention relates generally to apparatus for receiving, draining and disposing of dredged material comprising a mixture of water and sand or silt pumped from an underwater dredging site.

In particular, the apparatus comprises a mobile container which is divided into two compartments by a partition wall or weir and wherein water rising and separating from dredged material pumped into one compartment by a dredged material supply means flows over the weir into the other compartment from which it is then drained and the relatively dry sand or silt remaining in the said one compartment is then transported to a disposal site and removed from the mobile container.

2. Description of the Prior Art

In some underwater dredging operations carried out to clear navigation channels of sand or silt or to remove unwanted build-up near beaches, breakwaters or docksides, dredged material is pumped through a hose from a submerged dredge head into dump trucks on a nearby shore for transport to and disposal at some remote location. Transport of dredged material comprising a mixture of water and sand or silt is uneconomical and it is desirable to separate and dispose of the water before transport.

My U.S. Pat. No. 4,854,058, issued Aug. 8, 1989, and entitled "Dredging Apparatus Having a Diver-Operated Hand-Held Dredge Head for Quasi-Closed Loop System" discloses a dump truck having a conventional dump body containing a large removable filter unit containing a water pump, which unit is temporarily placed within the dump body prior to pumping dredged material into the dump body. After the dredged material pumped into the dump body has been drained of water by means of the pump-operated filter unit, the filter unit is physically removed from the dump body by means of a crane and the dump truck is then driven to some remote location whereat the substantially dry solid particulate matter is dumped from the truck. The foregoing arrangement enables the same pump-operated filter unit to be used in each successive dump truck arriving at the loading site. However, emplacement and removal of the filter unit for each truck requires a crane and involves expenditure of time, labor and money.

SUMMARY OF THE PRESENT INVENTION

The present invention pertains to mobile apparatus for receiving, draining and disposing of dredged material. The mobile apparatus comprises a vehicle, such as a truck or trailer; a container mounted on the vehicle; a partition wall or weir mounted in the container and dividing it into two compartments, one compartment for receiving dredged material in the form of a mixture of liquid (water) and particulate solid matter (sand and/or silt), and the other compartment for receiving water separated from the mixture in said one compartment and overflowing the weir into said other compartment; means for supplying said dredged material to said one compartment; means, including a drain port on the container, selectively operable to drain water collected in said other compartment; and means for effecting removal of the relatively dry solid particulate matter from said one compartment.

In the preferred embodiments the container takes the form of a dump body and said one compartment is a rear compartment located at the rear end of the dump body and said other compartment is a relatively smaller front compartment located at the front end of the dump body. The means for effecting removal of the relatively dry solid particulate matter from said one compartment thereof comprises: means for pivotally mounting the container on the vehicle; means for selectively moving the container between a generally horizontal loading position and a tilted position wherein the relatively dry solid particulate flows or slides toward the rear wall of the rear compartment; a discharge opening in the rear wall of the rear compartment for discharge of the drained, relatively dry particulate matter; a tailgate movably mounted on the rear wall; sealing means for the tailgate; and means for moving the tailgate between a closed, sealed position relative to the discharge opening while the container is in horizontal loading position and the rear compartment is being loaded with dredged material and an open position relative to said discharge opening when the container is moved to tilted position.

In the preferred embodiments the partition wall or weir is provided near its lower edge with one-way valve means, such as one or more sluice holes which communicate between the two compartments and each sluice hole is provided with a gravity-operated flapper valve which closes the sluice hole when the container is in loading position and opens the sluice hole when the container is in tilted position to thereby allow a small amounts of residual water in the front compartment to drain therethrough across the floor of the rear compartment to facilitate sliding and discharge of the relatively dry particulate matter through the discharge opening.

In one embodiment of the apparatus the means for supplying dredged material to the said one compartment comprises a supply conduit in the form of a flexible supply hose which is aimed toward that end of said one compartment most remote from the partition wall or weir so as to fill that end with sand first and facilitate water separation.

In another embodiment of the apparatus the means for supplying dredged material to the said one compartment comprises a supply conduit in the form of a rigid supply pipe disposed lengthwise of and above said other compartment and having a series of spaced apart supply holes along the bottom thereof. The supply pipe is fed with dredged material from the end thereof most remote from the partition wall or weir so that the end of the said one compartment most remote from the partition wall or weir fills up first and the rising level of sand progressively blocks the supply holes to thereby control the manner in which said one compartment is filled to facilitate water separation.

The apparatus in accordance with the present invention offer several advantages over the prior art. For example, the apparatus is self-contained and does not require the filter unit (with pump therein) as disclosed in my U.S. Pat. No. 4,854,058 or equipment for installing and removing the same, thereby saving time, labor and money. The partition member or weir, with or without sluice holes and flapper valves therefor, is easily and economically installed in a conventional, commercially available dump truck body, as are the sealing means for the tailgate thereof and the means for operating the tailgate. The dredged material supply means directs such material to a specific location and in a specific manner so as to facilitate separation of the liquid and the solid particulate matter. Other objects and advantages of the invention will hereafter appear.

DESCRIPTION OF PREFERRED EMBODIMENTS GENERAL ARRANGEMENT OF FIRST EMBODIMENT

Figure 1:
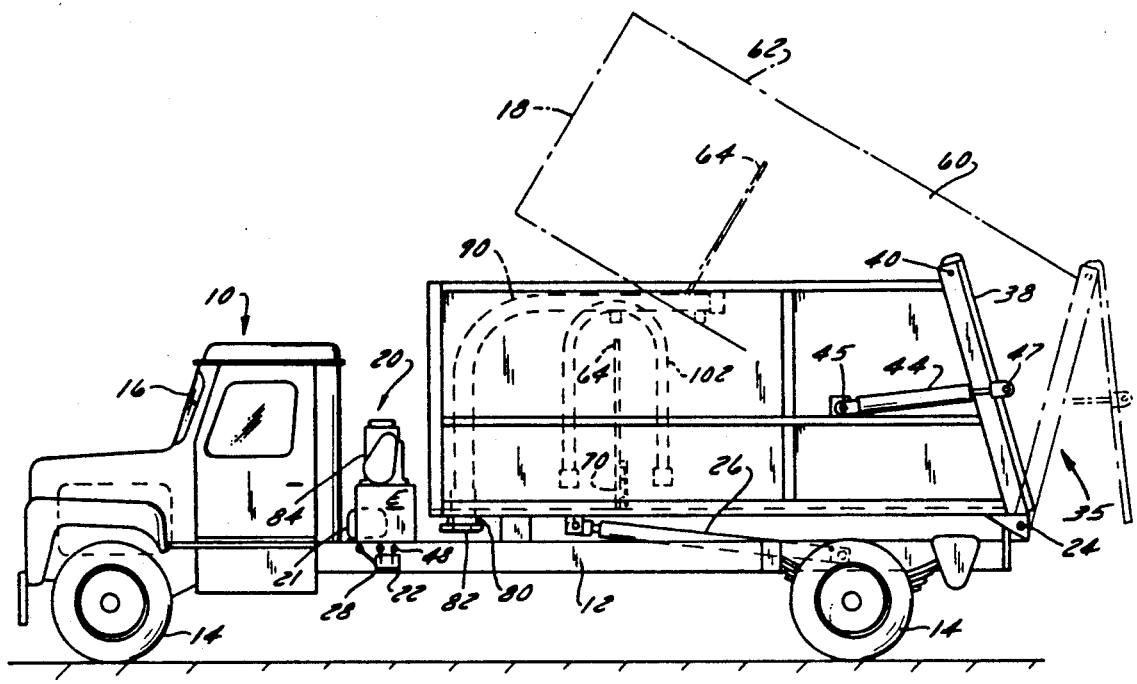
FIG. 1 is a side elevation view of a dump truck in accordance with one embodiment of the present invention.

FIG. 1 shows a first preferred embodiment of mobile apparatus in accordance with the invention and comprising a vehicle, such as a dump truck 10, having a chassis 12 on which are mounted ground-engaging wheels 14, an operator's cab 16, a tiltable dump body 18, a motor-driven pump mechanism 20, a hydraulic power supply mechanism 21 and an operator's hydraulic control valve assembly 22.

Figure 4:
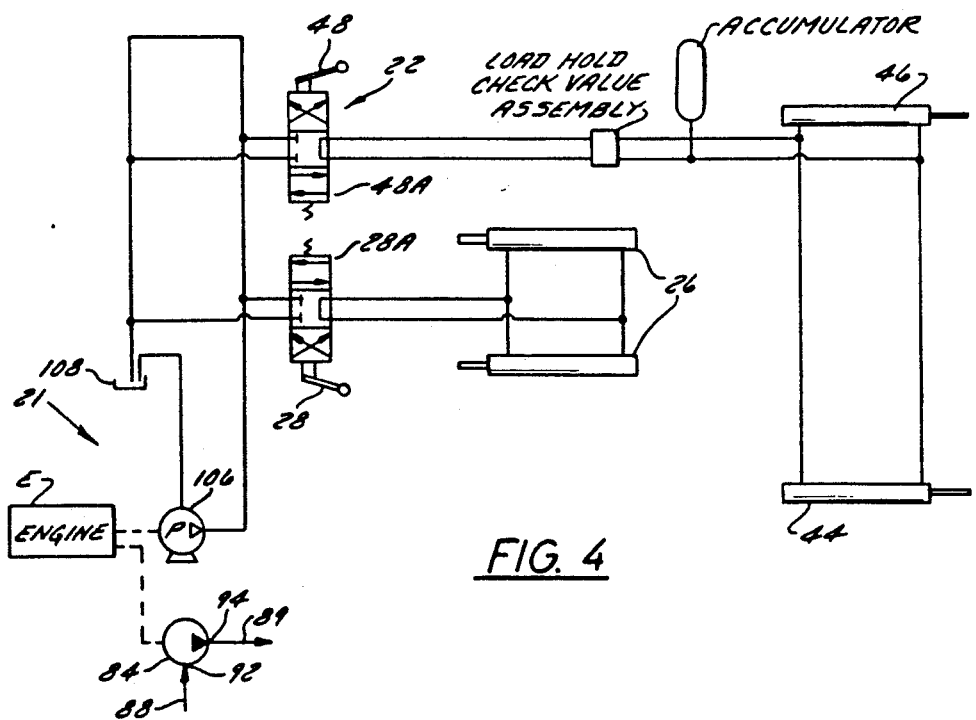
FIG. 4 is a schematic diagram of the hydraulic control circuit for operable components shown in FIGS. 1, 2 and 3.

Dump body 18 is pivotally mounted on chassis 12 by pivot means 24 which enables the body to be moved between its lowered, generally horizontal loading and transport position (shown in solid lines in FIG. 1) and its raised, tilted unloading or dumping position (shown in dashed lines in FIG. 1) by means of a pair of large extendable/retractable hydraulic cylinders 26 pivotally connected between chassis 12 and dump body 18 in response to the operator's manipulation of a hydraulic control lever 28 in hydraulic control valve assembly 22, as FIG. 4 shows.

Figure 3:
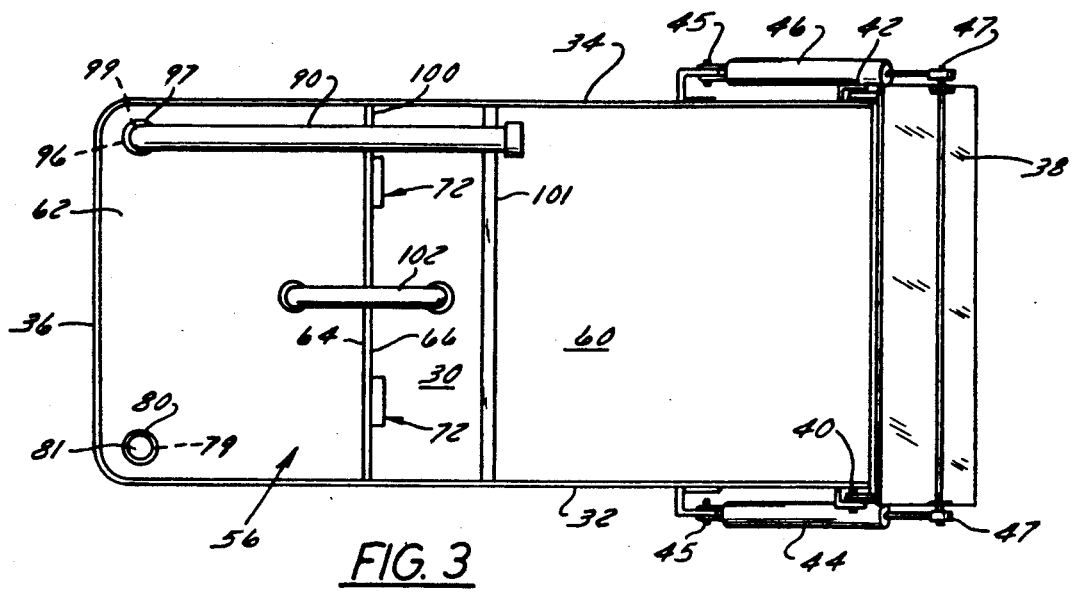
FIG. 3 is a top plan schematic view of the dump body shown in FIG. 2.
Figure 2:
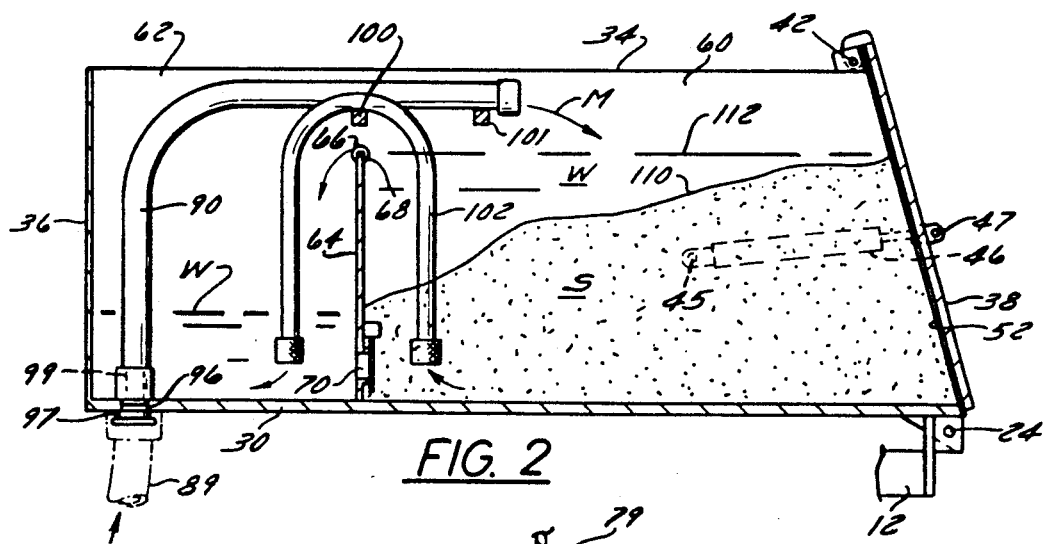
FIG. 2 is an enlarged side elevation schematic view of the dump body of the dump truck of FIG. 1 with portions broken away to expose interior details.

As FIGS. 1, 2 and 3 show, dump body 18, which is fabricated of heavy sheet metal and appropriate reenforcement members, comprises a floor 30, a pair of laterally spaced-apart side walls 32 and 34, a front wall 36 and a rear wall defined by a pivotally movable rear tailgate 38 which, as FIG. 1 shows, is movable between a closed, sealed position (shown in solid lines in FIG. 1) and an open position (shown in dashed lines in FIG. 1) relative to a discharge opening 35 at the rear of dump body 18.

The walls 32, 34 and 36 of dump body 18 and closed tailgate 38, all of which have top edges that are a substantially the same height above floor 30, cooperate to define a cavity 56 in dump body 18 which is open at its top.

Tailgate 38 is pivotally mounted on the upper rear ends of the side walls 32 and 34 by pivot means 40 and 42, respectively and is pivotally movable by means of a pair of extendable/retractable hydraulic cylinders 44 and 46, respectively, each of which is pivotally connected at one end 45 to its respective side wall of dump body 18 and at its other end 47 to tailgate 38. The cylinders 44 and 46 are simultaneously operable in response to the operator's manipulation of a hydraulic control lever 48 in control assembly 22, as FIG. 4 shows.

Figure 5:
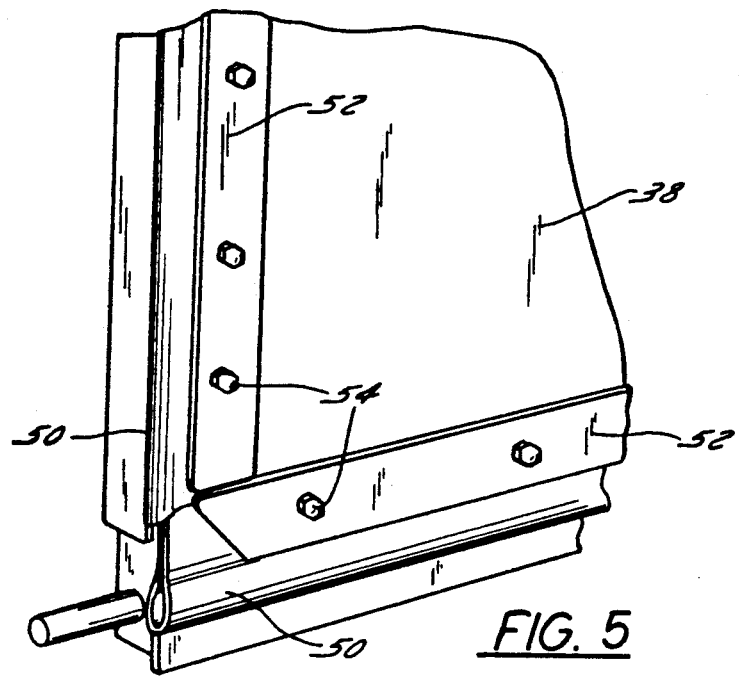
FIG. 5 is an enlarged perspective view of the inner surface of the tailgate showing sealing means thereon.

As FIG. 5 shows, tailgate 38 is provided on its inner surface around the peripheral edges thereof with sealing means in the form of lengths of flexible resilient hose 50 which are secured on by clamping to the tailgate by strips of metal 52 attached to the tailgate by screws or bolts 54. The sealing means operate to prevent leakage of material from discharge opening 35 at the rear end of dump body 18 when tailgate 38 is in closed position, as hereinafter explained.

In accordance with the invention, cavity 56 in dump body 18 is divided into a first or rear compartment 60 and a second or front compartment 62, smaller in volume than rear compartment 60, by a partition means in the form of a rigid partition wall or weir 64, preferably made of sheet metal, which is rigidly secured in sealed relationship, as by welding along its edges, to the side walls 32 and 34 and floor 30 of dump body 18. Partition wall 64 extends upwardly from floor 30 so that its top edge 66, which is rounded as by welding a small-diameter tubular member 68 there along, terminates about 12 inches below the top edges of the associated side walls 32 and 34. Partition wall or weir 64 separates the compartments 60 and 62 and serves as a weir over the top edge 66 thereof water flows as rear compartment 60 is being filled with dredged material, as hereinafter explained.

Partition wall 64 is provided near its lower edge with one or more sluice ports or sluice holes 70, shown in FIGS. 1, 2, 3, 6, 7 and 8, which afford communication between front compartment 62 and rear compartment 60. Each sluice port 70 is closed by a gravity-operated flapper valve 72, located in chamber 60, when dump body 18 is in lowered, horizontal position (see FIGS. 2 and 7), but each sluice port 70 is opened by its flapper valve 72 when dump body 18 is in tilted position (see FIG. 8). The valves 72, when open, allow a small amount of residual water remaining in front compartment 62 after it has been drained to flow into rear compartment 60 through the sluice ports 70 when dump body 18 is tilted, as hereinafter explained.

Figure 6:
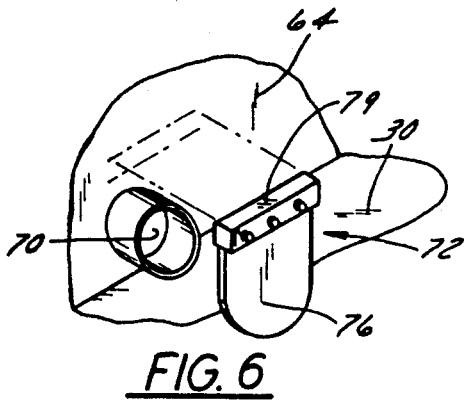
FIG. 6 is an enlarged perspective view of a flapper valve for a port in a partition wall shown in FIGS. 2 and 3.
Figure 7:
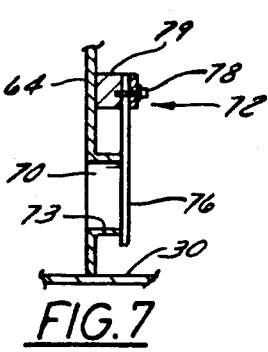
FIG. 7 is a vertical cross-section view of the flapper valve of FIG. 6 showing it in closed position when the dump body is in a horizontal loading position.
Figure 8:
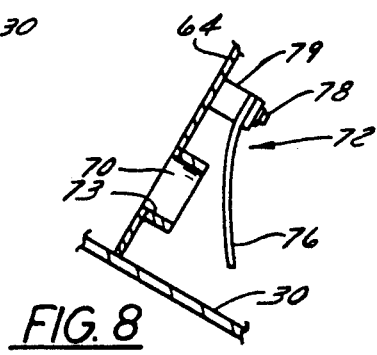
FIG. 8 is a view similar to FIG. 7 showing the flapper valve in open position when the dump body is in tilted position.

As FIGS. 6, 7 and 8 show, each flapper valve 72 comprises a tubular member 73 which defines sluice hole 70 and is rigidly secured as by welding to partition wall 64 concentrically with a hole in the partition wall. Tubular member 73 is associated with a downwardly depending flexible resilient flap 76, made of heavy rubber, for example, which is secured as by screws 78 along the upper edge of the flap to a support bracket 79 welded to partition wall 64. Flap 76 overlies and in registry with the sluice hole 70 through tubular member 73. When dump body 18 is in lowered or raised position, flap 76 covers or uncovers, respectively, the sluice hole 70 of tubular member 73 to close or open, respectively, the sluice hole 70.

Figure 9:
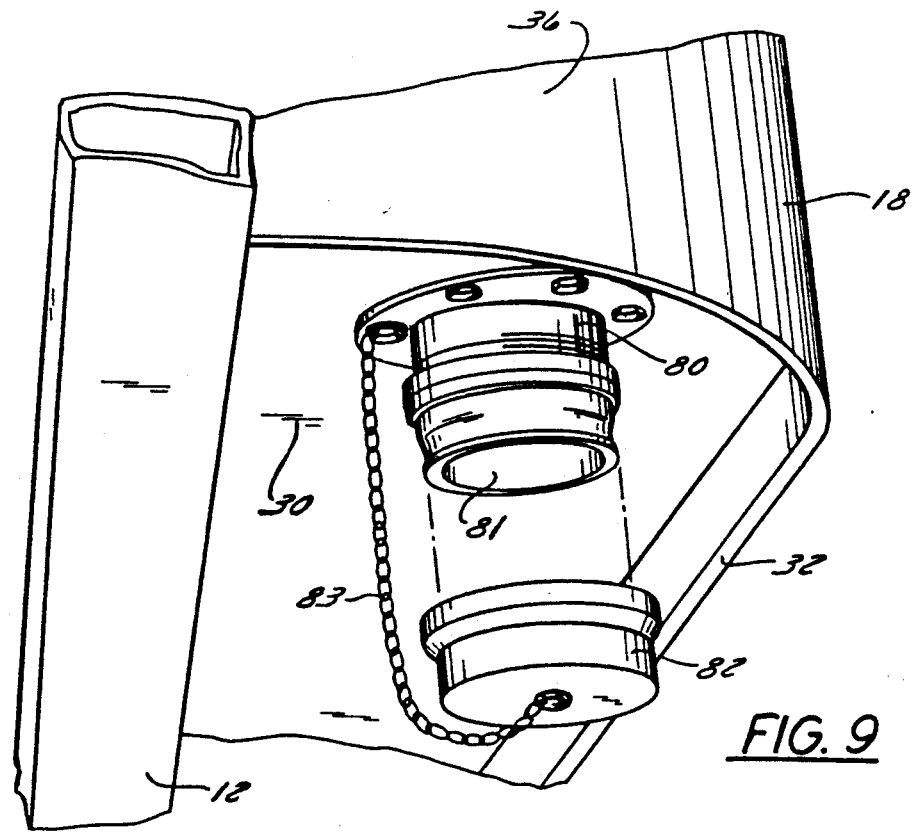
FIG. 9 is an enlarged perspective exterior view of a water drain port for a front compartment in the dump body of FIGS. 2 and 3.

As FIGS. 1, 3 and 9 show, the floor 30 of front compartment 62 in dump body 18 is provided with a hole 79 having a hollow coupling 80 therein which defines a water drain port 81 and which is provided with a manually attachable and removable drain port cap 82. Cap 82 is manually removable to allow water accumulated in front compartment 62 to drain therefrom through drain port 81, as hereinafter explained. Cap 82 is secured by a chain 83 to prevent loss of misplacement thereof.

Means are provided to supply dredged material to rear compartment 60. As FIGS. 2 and 3 show, the floor 30 of front chamber 62 in dump body 18 is also provided with a hole 96 having a hollow coupling 97 therein, similar in construction to coupling 80, but which serves as a dredged material inlet port 99, as hereinafter explained.

Referring to FIGS. 1, 2, 3 and 4, the pump mechanism 20 is mounted on chassis 12 and comprises a pump 84 driven by an internal combusion engine E. Pump 84 receives dredged material through a hose 88 from a dredging site (not shown) and delivers the material through an intermediate hose 89 (FIGS. 2 and 4) and a supply conduit in the form of a flexible supply hose 90 into rear compartment 60 in dump body 18. As FIG. 4 shows, pump 84 has an inlet port 92 to which hose 88 is connected. Pump 84 has an outlet port 94 which is connected by hose 89 to inlet port 99 on the outside of coupling 97 hereinbefore referred to (see FIG. 2). The aforementioned supply hose 90 has one end connected to the inside of coupling 97 and is supported on a pair of transverse support bars 100 and 101 which extend between the side walls 32 and 34 of dump body 18 so that the discharge end of supply hose 90 is located and aimed in a position to discharge dredged material into and toward the rear end of rear compartment 60 of dump body 18.

By directing the dredged material mixture M in such a manner, the sand S tends to pile up higher toward the rear end of rear compartment 60 and this facilitates the separation of the water W therefrom, as FIG. 2 shows. The mound of sand S progressively builds up toward the front end of compartment 60 and this leaves a clear region in compartment 60 wherein relatively clear water can accumulate and eventually spill over partition wall 64.

A siphon hose 102 is looped or suspended over support bar 100 so that one end of the hose depends into front compartment 62 near the bottom thereof and the other end depends into rear compartment 60 of dump body 18 near the bottom thereof.

Referring to FIG. 4, the hydraulic power supply mechanism 21 which is mounted on vehicle chassis 12 is driven by an internal combustion engine E and comprises a hydraulic pump 106 driven by the engine and a hydraulic fluid reservoir 108. If preferred, supply mechanism 21 and a separate engine (not shown) or motor (not shown) therefor could be mounted separately, as on a trailer (not shown) towed by dump truck 10. When power supply mechanism 21 is in operation, pump 106 supplies hydraulic operating fluid under pressure to the operator's control valve assembly 22. As FIG. 4 shows, the control valves 28A and 48A are conventional three-position (forward, neutral, reverse) type hydraulic control valves. Each valve is connected by two hydraulic lines to the respective component which it controls. Each of the two lines serves as a fluid supply or fluid return line, as valve lever position and operating conditions require. When a control valve 28A or 48A is opened by moving to its forward position in response to the operator's manipulation of a control lever 28 or 48, respectively, pressurized hydraulic fluid is supplied to operate hydraulic dump cylinders 26 and raise dump body 18 and to operate the tailgate cylinders 44 and 46 and open tailgate 38. When a control valve 28A or 48A is opened by moving to its reverse position the dump body 18 is lowered and the tailgate 38 is closed, respectively.

OPERATION OF FIRST EMBODIMENT

Initially assume that truck 10 is stopped near a dredging site, that its dump body 18 is in lowered, horizontal, loading position, that tailgate 38 is closed and seals the discharge opening 35 of the dump body, that drain port 81 is closed by its cap 82, and that each flapper valve 72 closes its associated sluice port 70 in partition wall 64. Further assume that inlet port 92 of dredging material pump 84 is connected by hose 88 to a supply of dredged material and that hose 89 to the outside of port 99 in dump body 18 by hose 89 and that the inside of port 99 is connected to supply hose 90. Assume that siphon hose 102 is in place. Also assume that engine E, drege pump 84 and hydraulic pump 106 of power supply unit 21 are in operation so that pressurized hydraulic fluid is being supplied to control valve assembly 22 and that control valves 28A and 48A are in neutral position.

At the commencement of loading, dredged material flows from the dredging site, through hose 88, through dredge pump 84 which is being driven by engine E, through supply hose 90 and into rear compartment 60 in dump body 18. The dredged material takes the form of a fluid mixture M of liquid, such as water W and solid particulate matter, such as sand or silt S (hereafter called sand), for example. The volumetric ratio between the sand and water in mixture M can vary but typically is on the order of 4:1 and, therefore, rear compartment 60 has a larger volume than front compartment 62.

The discharge end of supply hose 90 is positioned and directed so that the mixture M therefrom is directed toward the rear end of rear compartment 60. Furthermore, as the mixture M accumulates, gravity causes the sand S, which is heavier than the water W, to settle out and accumulate on the bottom of rear compartment 60 and the water W in mixture M starts to separate therefrom and rises toward the top of compartment 60. Since the mixture M is directed toward the rear end of rear compartment 60, the sand S settles out in such a manner as to define a pile having a sloped surface 110 (shown in FIG. 2) which slopes downwardly toward the front end of rear compartment 60. However, because the rising level 112 (shown in FIG. 2) of water W in rear compartment 60 is horizontal, the water depth is substantially greater near the front end of rear compartment 60. As the mixture M accummulates in rear compartment 60, it bears against the flaps 76 of the flapper valves 72 and maintains the sluice ports 70 tightly closed. As FIG. 2 shows, the quantity of mixture M being pumped into rear compartment 60 increases, the water level 112 eventually rises to the top edge 66 of partition wall 64 and spills or flows thereover into front compartment 62 wherein it accumulates. As this is occuring, water W is also rising in that end of siphon 102 which is disposed in rear compartment 60 and buried in the sand S separating from the mixture M therein. The water W gradually rises in siphon 102 and eventually flows out the other end of siphon 102 into front compartment 62 in dump body 18. When rear compartment 60 is filled to a level whereat addition of further mixture M thereinto would cause raw mixture M to overflow the top edge 66 of partition wall 64, the operator stops dredge pump 84. The operator then manually removes drain cap 82 from coupling 80 to open drain port 81 and allow the water W accumulated in front compartment 62 to drain therefrom onto the ground. A small amount of residual water remains trapped in compartment 62 because of the shape of coupling 80.

At this stage, the sand S in rear chamber 60 is relatively dry and ready for transport to a disposal site. At this point, engine E and power supply unit 21 may be shut down to conserve fuel. Truck 10 is then driven to an appropriate location whereat the relatively dry sand S is to be dumped.

To commence dumping, engine E and power supply unit 21 is restarted, the operator manipulates lever 28 of valve 28A to extend the dump cylinders 26 and tilt dump body 18. Simultaneously, or after dump body 18 is fully tilted, the operator manipulates lever 48 of valve 48A to operate the tailgate cylinders 44 and 46 to open tailgate 38. The sand S in rear compartment 60 of dump body 18 is thus able to pour out through opening 35 beneath open tailgate 38. Since the sand S is now relatively dry, some of it may tend to adhere to floor 30 in rear compartment 60 and not pour freely therefrom. However, as the sand S exits rear compartment 60, it flows away from and uncovers the flaps 76 of the flapper valves 72 which, because dump body 18 and partition wall 64 are tilted, are free to swing and depend vertically under the force of gravity and thereby open the sluice ports 70 (see FIG. 8). Thus, the small amount of residual water trapped in now-tilted front compartment 62 is able to flow through the sluice ports 70 and down and across the tilted floor 30 of rear compartment 60 to fluidize and enhance the flow of any sand S adhering to the floor 30 of rear compartment 60.

After all sand S is dumped, the operator manipulates the appropriate control levers to close tailgate 38 and to lower dump body 18 to transport position, whereupon engine E and power supply mechanism 21 may be shut down until again needed.

ARRANGEMENT AND OPERATION OF SECOND EMBODIMENT

Figure 11:
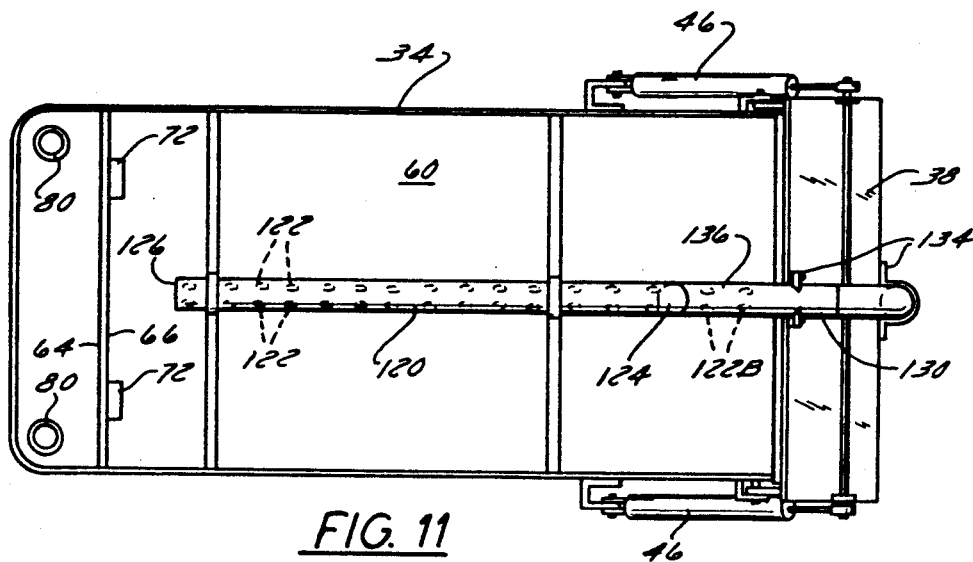
FIG. 11 is a top plan view of the dump body and means shown in FIG. 10.
Figure 10:
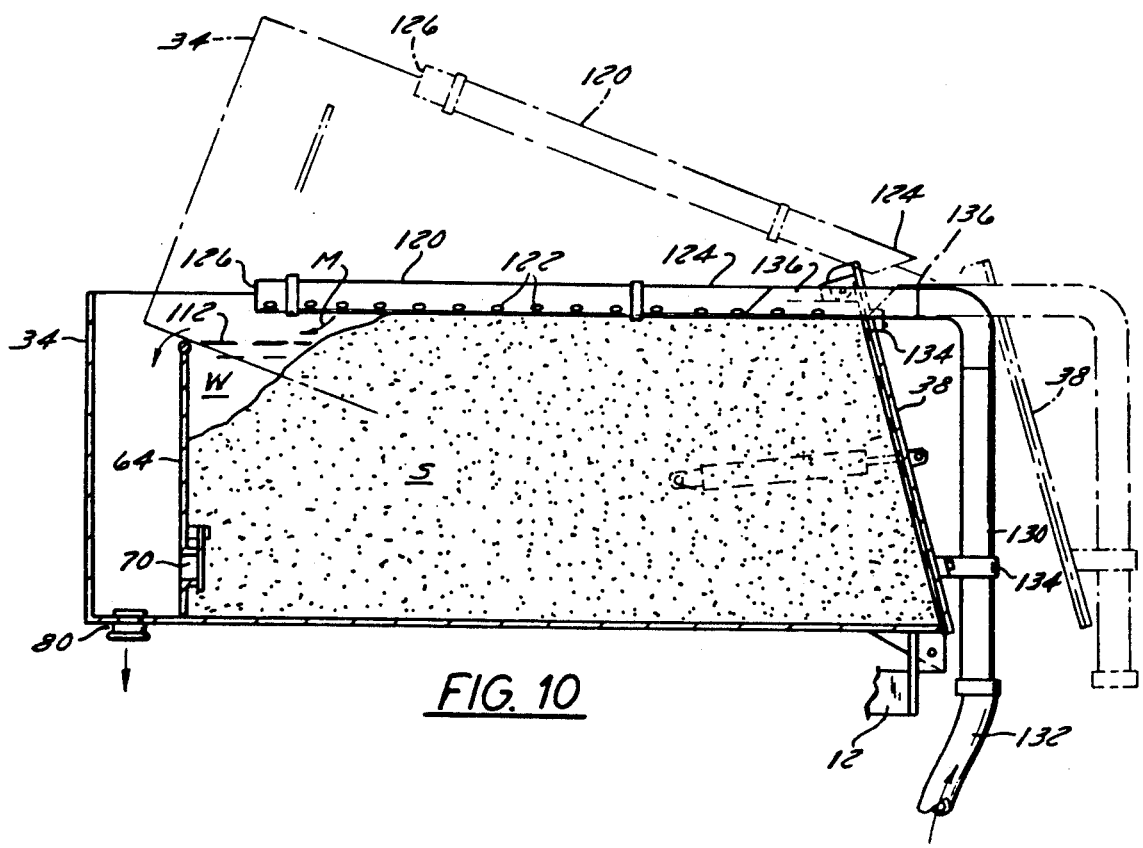
FIG. 10 is a side elevation view of a dump body of a dump truck in accordance with another embodiment of the invention and showing another type of means for supplying dredged material to the dump body.

FIGS. 10 and 11 depict a second embodiment of the invention wherein the means for supplying dredged material in the form of mixture M to rear compartment 60 of dump body 18 differ from the arrangement shown in the first embodiment. In particular, in FIGS. 1, 2 and 3 for the first embodiments such means comprise a supply conduit in the form of the flexible supply hose 90 which has its inlet end connected to inlet port 99 of coupling 97 in hole 96 in dump body 18 and has its outlet end aimed at the rear end of rear compartment 60. That arrangement enables the sand S of mixture M to mound up at the rear end of rear compartment 60 as the operator changes the position of the flexible supply hose 90. However, if the output pressure of supply pump 84 is unduly high, entry of the mixture M into rear compartment 60 is accompanied by a great degree of turbulence and splashing which can adversely effect build up of the mound of sand S and slow down separation of water W from the mixture M.

The structure and arrangement shown in FIGS. 10 and 11 is designed to overcome this. In the second embodiment of the invention the means for supplying dredged material in the form of mixture M to rear compartment 60 comprises a supply conduit in the form of a rigid supply pipe 120 disposed lengthwise of and above rear compartment 60 and having two rows of a series of spaced apart supply holes 122 along and near the bottom thereof. The supply pipe 120 is fed with dredged material from the rear end 124 thereof, i.e. the end thereof most remote from the partition wall or weir 64 so that the rear end of rear compartment 60, i.e. that end most remote from partition wall or weir 64, fills up first and the rising level of sand S progressively blocks the supply holes 122 to thereby control the manner in which rear compartment 60 is filled to facilitate water separation, as FIG. 10 shows.

Supply pipe 120 is rigidly secured to dump body 18 by means of a support member attached to and between the side walls 32 and 34 of the dump body. Pipe 120 is open at its front end. The rear inlet end 124 of pipe 120 is supplied from a generally L-shaped intermediate pipe 130 which is connected to outlet port 94 of pump 84 by means of a hose or pipe 132. Intermediate pipe 130 is rigidly secured to the exterior of tailgate 38 by means of brackets 134. Intermediate pipe 130 is provided with a few holes 122B near its outlet end 136. Since, as FIG. 10 shows, there is relative movement between supply pipe 120 and intermediate pipe 130 and the rear inlet end 136 of supply pipe 120 are each cut on a bias and make end-to-end contact with each other but are not permanently joined together. However, when dump body 18 is in horizontal position and tailgate 38 is in closed position, the end-to-end contact between supply pipe 120 and intermediate pipe 130 is sufficiently close and tight so as to prevent the leakage of mixture M out through the joint.

It is to be understood, however, that means other than intermediate pipe 130, such as a flexible hose (not shown) could be provided to supply the rear inlet end 124 of supply pipe 120. Furthermore, the holes 122 could be replaced by a continuous slot (not shown) extending along the underside of pipe 120.

In operation, assuming dump body 18 is horizontal and tailgate 38 is closed, the mixture M of dredged material is supplied by pump 84, through hose 132, through intermediate pipe 130 and through supply pipe 120. The bulk of the mixture M entering supply pipe 120 is first discharged through those holes 122B nearest the outlet end 136 of intermediate pipe 130 and then through those holes 122 nearest the inlet end 124 of supply pipe 120. Thus, the sand S of mixture M first fills the rear end of rear compartment 60. As the sand S builds up, the holes 122B in pipe 130 and those holes 122 near the rear end 124 of pipe 120 become blocked and this causes the mixture M to be expelled from those still unblocked holes 122 progressively nearer the front end 126 of supply pipe 120. This, in turn, causes the mound of sand S to gradually build up forwardly in compartment 60, as FIG. 10 shows. The fact that the pipes 120 and 130 separate as pipe 120 tilts during a dumping operation also permits pipe 120 to drain rearwardly and to clear itself during a dumping operation.

In all other respects, the second embodiment operates in the same manner as the first embodiment as hereinbefore described. If preferred, the second embodiment, like the first, may or may not be provided with a siphon 102.

I claim:

1. A mobile dump truck for use in dredging and having a dump body tiltable between a horizontal loading position and a rearwardly tilted dumping position, said body having a tailgate mounted at the rear end of said body and swingably mounted thereon for swinging between (1) a closed, sealed position for containing water in said truck when said body is in said horizontal position, and (2) an open dumping position when said body is tilting to said tilted dumping position;

a sealing means for sealing said tailgate with said body when in the closed position;

a hydraulic pump means having an inlet port for connection with a hose means for receiving a dredged mixture of solids and water from a pumping site and delivering said mixture to said truck body;

an imperforate and fixed partition wall mounted transversely in said body and having a top edge, said wall mounted in and dividing said body into first and second compartments, each compartment being open to atmosphere;

said first compartment being adapted to receive and contain said mixture from said pump means and to enable said solids to settle at the bottom of said first compartment under the force of gravity and to enable said water to rise towards the top of said compartment;

said second compartment being adapted to receive and contain said water which rises in said first compartment and flows over said top edge of said partition wall;

drain means selectively operable to effect removal of substantially all water from said second compartment;

and one-way valve means between said first and second compartments and operable when said body is tilted to permit residual water in said second compartment to flow therethrough and into said first compartment to effect removal of solids, remaining after said body is tilted, from said first compartment by washing it out of said tilted body via said open tailgate.

2. The truck set forth in claim 1 further characterized in that said one-way valve means is a flapper valve located in said wall.

3. The truck set forth in claim 1 further characterized in that said hose means has its discharge directed to one end of said first compartment most remote from said partition wall so as to first fill said one end with said mixture and thereby facilitate water separation.

4. Dredging apparatus comprising:

a mobile dump truck having an open top dump body tiltable between a horizontal loading position and a rearwardly tilted dumping position, said body having a tailgate mounted at the rear end of said body and swingably mounted thereon for swinging between (1) a closed, sealed position for containing water in said truck when said body is in said horizontal position, and (2) an open dumping position when said body is tilting to said tilted dumping position;

a sealing means for sealing said tailgate with said body when in the closed position;

a hydraulic pump means mounted on said truck, hydraulic cylinder means connected between said body and said tailgate for swinging said tailgate, said cylinder means actuated by said pump means, said pump means having an inlet port for connection with a hose means for receiving a dredged mixture of solids and water from a pumping site and delivering said mixture to said truck body;

a substantially vertical partition wall fixedly mounted transversely in said body and having a top edge, said wall mounted in and dividing said body into first and second compartments, each compartment being open to atmosphere;

said first compartment being adapted to receive and contain said mixture from said pump means and to enable said solids to settle at the bottom of said first compartment under the force of gravity and to enable said water to rise towards the top of said compartment;

said second compartment being adapted to receive and contain said water which rises in said first compartment and flows over said top edge of said partition wall;

drain means communicating with said second compartment and selectively operable to effect removal of substantially all water from said second compartment;

and fluid port means in said partition wall and operable when said body is tilted to permit residual water in said second compartment to flow therethrough and into said first compartment to effect removal of solids, remaining after said body is tilted, from said first compartment by washing it out of said tilted body.

5. Dredging apparatus for receiving, draining and disposing of dredged material and comprising:

a mobile dump truck having an open top dump body tiltable between a horizontal loading position and a rearwardly tilted dumping position, said body having a tailgate mounted at the rear end of said body and swingably mounted thereon for swinging between (1) a closed, sealed position for containing water in said truck when said body is in said horizontal position, and (2) an open dumping position when said body is tilting to said tilted dumping position;

flexible sealing means for sealing said tailgate with said body when in the closed position;

a hydraulic pump means mounted on said truck, hydraulic cylinders means connected between said truck and said dump body, said cylinder means being operably connected to said pump means for tilting said body, second hydraulic cylinder means connected between said body and said tailgate for swinging said tailgate, said second cylinder means actuated by said pump means;

said pump means having an inlet port for connection with a hose means for receiving a dredged mixture of solids and water from a remote pumping site and delivering said mixture to said truck body;

an imperforate and fixed vertical partition wall mounted transversely in said body and having a top edge, said wall mounted in and dividing said body into first and second compartments, each compartment being open to atmosphere;

said first compartment being adapted to receive and contain said dredged mixture from said pump means and to enable said solids to settle at the bottom of said first compartment under the force of gravity and to enable said water to rise towards the top of said compartment;

said second compartment being adapted to receive and contain said water which rises in said first compartment and flows over said top edge of said partition wall;

drain means communicating with said second compartment and selectively operable to effect removal of substantially all water from said second compartment;

and one-way fluid port means in said partition wall and adjacent the bottom thereof and operable when said body is tilted to permit residual water in said second compartment to flow therethrough and into and across said first compartment to effect removal of solids, remaining after said body is tilted, from said first compartment by washing it out of said tilted body via said open tailgate.

6. The apparatus set forth in claim 5 further characterized in that said one-way fluid port means is a gravity operated flapper valve.

* * * * *